United States Patent [19]

Malon et al.

[11] Patent Number: 4,992,221

[45] Date of Patent: Feb. 12, 1991

[54] ASYMMETRIC GAS SEPARATION MEMBRANES HAVING IMPROVED STRENGTH

[75] Inventors: Raymond F. Malon, St. Charles; Clint A. Cruse, St. John, both of Mo.

[73] Assignee: Permea, Inc., St. Louis, Mo.

[21] Appl. No.: 571,817

[22] Filed: Aug. 24, 1990

Related U.S. Application Data

[62] Division of Ser. No. 413,137, Sep. 27, 1989.

[51] Int. Cl.$^5$ ............................................. D01D 5/247
[52] U.S. Cl. ..................................... 264/41; 264/561; 264/209.1; 264/184; 264/211.15; 264/211.16; 264/233; 264/205; 210/500.23; 210/500.27
[58] Field of Search ................ 264/41, 184, 211.15, 264/211.16, 209.1, 233, 205, 561; 210/500.23, 500.27

[56] References Cited

U.S. PATENT DOCUMENTS

| | | | |
|---|---|---|---|
| 3,133,132 | 5/1964 | Loeb et al. | 264/49 |
| 3,886,066 | 5/1975 | Chen et al. | 210/500.41 |
| 4,163,725 | 8/1979 | Sano et al. | 210/490 |
| 4,200,726 | 4/1980 | Ishii et al. | 210/500.37 |
| 4,230,463 | 10/1980 | Henis et al. | 427/245 |
| 4,292,417 | 9/1981 | Ishii et al. | 210/500.41 |
| 4,319,008 | 3/1982 | Marze et al. | 210/500.41 |
| 4,612,119 | 9/1986 | Eguchi | 210/500.41 |
| 4,629,563 | 12/1986 | Wrasidlo | 210/500.41 |
| 4,695,383 | 9/1987 | Konagaya et al. | 521/184 |
| 4,840,819 | 6/1989 | Williams et al. | 210/490 |
| 4,865,785 | 9/1989 | Zwick | 210/500.41 |
| 4,871,494 | 10/1989 | Kesting et al. | 210/500.23 |
| 4,874,522 | 10/1989 | Okamoto et al. | 210/500.41 |
| 4,880,441 | 11/1989 | Kesting et al. | 55/70 |
| 4,882,057 | 11/1989 | Morgan | 210/500.23 |
| 4,894,159 | 1/1990 | Guiver et al. | 210/500.41 |
| 4,902,422 | 2/1990 | Pinnau et al. | 210/500.29 |
| 4,906,375 | 3/1990 | Heilmann | 210/500.23 |

*Primary Examiner*—Morton Foelak
*Attorney, Agent, or Firm*—Martha A. Michaels

[57] ABSTRACT

A dope for forming membranes and the resulting asymmetric gas separation membranes are disclosed, the membranes having graded density skins which exhibit improved permeability characteristics and increased failure pressure strength. The membranes are produced from a process utilizing membrane forming dopes of complexing solvent systems formulated from two non-solvents and one or more solvents. The non-solvents are chosen one each, from non-solvents grouped according to non-solvent strength, i.e., one strong non-solvent and one weak non-solvent which are combined with one or more solvents in an acid:base complex solvent system for dissolving high weight percent total solids of membrane forming polymers. The process for forming the membranes is also disclosed.

11 Claims, No Drawings

ASYMMETRIC GAS SEPARATION MEMBRANES HAVING IMPROVED STRENGTH

This is a Division of application Ser. No. 07/413,137, filed Sept. 27, 1989, now allowed.

This invention relates to a process for forming asymmetric gas separation membranes having improved pressure strength. In another aspect, the invention relates to a membrane dope comprising acid:base complex solvent systems which dissolve high weight percent total solids of membrane forming polymers. In yet another aspect, the invention relates to a process for forming improved asymmetric gas separation membranes from high viscosity dopes having low coagulation (g) values which enhance rapid gelation and desolvation resulting in substantially macrovoid-free membranes having high free volume.

The viability of the use of membranes for gas separations as compared to other separation procedures such as adsorption, absorption, and liquefaction often depends on the cost of the apparatus and its operation, including energy consumption, degree of selectivity of separation and rate of separation. Other important considerations are the total pressure loss caused by the apparatus conducting the separation process, the useful life for such apparatus and the size and the ease of use of such apparatus. Thus, membranes are sought which provide desired selectivities of separation, fluxes and strength. Moreover, in order to be commercially attractive on an economic basis, the membranes are preferably capable of being manufactured in large quantities while achieving a reliable product quality and being readily and relatively inexpensively assembled into a permeator. Particularly advantageous membranes are unitary, asymmetric, hollow fiber membranes which have a relatively thin separating layer, barrier layer, or active layer, integral with a porous substrate which provides support to the separating layer and offers little, if any, resistance to passage of gases. In order to prepare these asymmetric membranes, a unitary membrane structure must be formed which possesses diametrically opposed structures. The separating layer must be formed such that it is thin and possesses few, if any, pores or other defects. On the other hand, the conditions of formation of the asymmetric membrane, must also result in a support structure which is highly open such that it offers low resistance to gas flow.

Numerous proposals have been made pertaining to the preparation of asymmetric membranes prepared in film and in hollow fiber form. In general, asymmetric membranes are prepared in film form by casting a solution of the polymer onto a surface, e.g., polished glass. The cast polymer solution may be allowed to coagulate at least partially, in air or gaseous or vaporous environment and then immersed in a liquid coagulant. Considerable flexibility exists in preparing film membranes. For instance, since the polymer solution is placed on a support, the membrane precursor structure need not be self-supporting at least until after coagulation is completed. Similarly, since one surface of the cast membrane is in contact with the support, each side of the membrane may be subjected to different coagulation conditions thereby permitting substantially different structures to be achieved at each surface of the membrane.

Accordingly, membranes having a relatively thin layer with essentially an absence of pores may be obtained at one surface of the film membranes, while the remainder of the membrane may be relatively porous. Moreover, since the film membrane precursor is supported, the coagulation conditions, including coagulation times, can vary widely to achieve the desired film membrane structure. In some instances, however, film membranes may not be as attractive as hollow fiber membranes because of the need for film membranes to be supported to withstand operating conditions and because of the overall complexity of an apparatus containing film membranes.

Membranes in the configuration of hollow fibers may overcome some of the deficiencies of film membranes for many separation operations. Hollow fibers are generally self-supporting even under severe operating conditions and can provide a greater amount of membrane surface area per unit volume of separation apparatus than that which can be provided by film membranes. Thus, a separation apparatus containing hollow fibers can be attractive from a standpoint of convenience, size and reduced complexity of design.

Many different process considerations are involved in making a hollow fiber membrane than are involved in making a film membrane. For instance, no solid support or interface can be provided in a process for spinning hollow fiber membranes. Moreover, in spinning procedures, the polymer solution must be of sufficient viscosity to provide a self-supporting extrudate prior to and during gelation, and the gelation must be quickly effected after extrusion such that the hollow fiber membrane is not adversely affected.

Processes for the formation of asymmetric membranes must not only meet the criteria of forming the membranes, but also must be compatible with hollow fiber spinning capabilities. Hence, many constraints are placed upon the techniques available to produce asymmetric hollow fiber membranes. Commonly, in hollow fiber membrane spinning procedures, a solution of the polymer, i.e., a dope to form the hollow fiber membrane in a solvent system is extruded from the orifice of a tube-in-orifice a spinnerette suitable for forming a hollow fiber configuration. A gas or liquid is injected into the bore of the hollow fiber extrudate through the tube of the spinnerette such that the hollow fiber configuration can be maintained. The hollow fiber extrudate must quickly be coagulated, e.g., by contact with a non-solvent for the polymer, such that the hollow fiber configuration can be maintained. The hollow fiber spinning process contains many variables which may affect the structure or morphology of the hollow fiber membrane such as the conditions of the polymer solution when extruded from the spinnerette, the nature of the fluid maintained in the bore of the hollow fiber membrane extrudate, the environment to which the exterior of the hollow fiber extrudate is subjected, the rapidity of coagulation of the polymer and the hollow fiber extrudate and the like. Since the hollow fiber forming process is one of phase inversion or coagulation of the polymer from a polymer solution, the nature of the solvent system for the polymer is highly influential in determining the morphology of the hollow fiber membrane and its gas separation properties.

The solvent system must possess numerous properties in order to be suitable for forming asymmetric membranes. For example, the solvent system must be capable of dissolving the polymer for forming the hollow fiber membrane but yet permit the polymer to readily coagulate to form the asymmetric structure. Furthermore, when hollow fiber membranes are desired, the solvent system should enable the polymer solution to be prepared having suitable viscosities for hollow fiber membrane formation.

A hollow fiber spinning dope should be comprised of a solvent system which is miscible with the non-solvents used to assist in coagulation of the polymer and should be capable of being removed, e.g., by washing from the coagulated structure, such that the membrane is not unduly plasticized or densified and thereby made undesirable for gas separation.

More recently, asymmetric gas separation membranes have been spun from solvent systems which include non-solvent in the solvent system with the polymer which comprises the spinning dope. In this way greater control of the gelation is achieved and simpler coagulation procedures are possible. All components of the solvent system, the spinning dope, the coagulation medium and the washing fluids should work in cooperation in order to avoid undesired morphology in the membrane, low membrane strengths and the like. Moreover, because of the quantities required to effect coagulation, washing, etc., the expense of certain nonaqueous materials could be a factor in the economics of the spinning process. Accordingly, it is desirable to use highly safe, readily available materials, such as water, whenever possible in the spinning process, especially as a coagulation medium and in washing to remove solvent from the hollow fiber membrane. The suitability of water, depends to a large extent, upon the properties of the solvent system with respect to water, in particular the ability of water to remove solvents and non-solvents from the formed membrane. Further, the polymer must not be water soluble.

Loeb and Sourirajan, U.S. Pat. No. 3,133,132, demonstrated for the first time that it was possible through the preparation of asymmetric membranes to decouple the so-called intrinsic permeabilities from intrinsic separation factors. Asymmetric membranes taught by Loeb and Sourirajan and multicomponent membranes taught by Henis and Tripodi, U.S. Pat. No. 4,230,463, even though presenting higher permeabilities than dense membranes, still coupled these permeabilities with separation factors in an interdependency. High permeability asymmetric membranes exhibiting constant or improved, and in some cases the essentially intrinsic separation factor are presented by U.S. pending patent application, Ser. No. 296,843 entitled Asymmetric Gas Separation Membranes Having Graded Density Skins, filed Jan. 12, 1989, herein incorporated by reference. As demonstrated by the elevated first heat $T_g$ of the membranes according to the teachings of 296,843, the origin of increased permeability is related to increased free volume.

Loeb and Sourirajan disclosed a method for preparing a modified cellulose acetate membrane for desalination of water by first casting a solution of cellulose acetate as a thin layer, and then forming a dense membrane skin on the thin layer through various techniques such as solvent evaporation followed by quenching in cold water. The formation of these dense-skinned membranes generally involved a final annealing treatment in hot water. The membranes prepared by the Loeb-Sourirajan method are composed of two distinct regions made of the same cellulose acetate material: a thin, dense, semipermeable skin and a less dense, void-containing, nonselective support region. Since the membranes are not of essentially the same density throughout their structure, they fall within the definition of anisotropic membranes. Because of these distinct regions and the difference in membrane properties which can be observed depending on which surface of the membrane faces a fluid feed mixture, the Loeb-Sourirajan membranes can be described as being asymmetric.

The asymmetric membrane provided by Henis and Tripodi, is a multicomponent membrane comprised of a coating in occluding contact with a porous separation membrane. The separation properties of the multicomponent membranes generally are determined by the material of the porous separation membrane as opposed to the material of the occluding coating. The multicomponent membranes provide gas separation membranes which can be fabricated from a wide variety of permselective polymeric materials and thus enable greater latitude in selection of the membrane material most advantageous for a given gas separation. These multicomponent membranes are solvent spun from dopes of glassy, aromatic sulfone polymers among other polymers and are gelled in water and/or other polar media. The separation factors for at least one pair of gases are increased by at least 35 percent through utilization of the multicomponent membranes; however, the separation factor of the gases and the permeability of the membrane remain coupled; for instance, an increase in the separation factor reduces the permeation rate and vice versa.

In U.S. patent application, Ser. No. 66,751, filed July 6, 1987, (herein incorporated by reference) is disclosed a process for preparing asymmetric gas separation membranes having graded density skins and substantially macrovoid-free morphology. These membranes are comprised of glassy hydrophobic polymers and have increased free volume as evidenced by the membrane first heat Tg which is greater than the Tg of a bulk sample of the polymers. The resultant membranes exhibit high permeabilities and the potential for intrinsic separation factors realized after any porous defects of the membranes are occlusively sealed with a highly permeable silicone polymer or similar occluding coating. The membranes exhibit selectivities that can approach those of dense films of the polymers and permeabilities which are much greater than those of state of the art asymmetric multicomponent membranes comprised of the same polymer, for example as taught by Henis et al.

SUMMARY OF THE INVENTION

A process for forming asymmetric membranes having potential for gas separation and improved strength is provided by utilizing a sol or dope containing a glassy hydrophobic polymer and a complexing solvent system formulated of two non-solvents and one or more solvents for the hydrophobic polymer. The non-solvents are chosen, one each, from non-solvents grouped according to non-solvent strength, that is, one strong non-solvent and one weak non-solvent.

A strong non-solvent is defined as one having a $\Delta\sigma = (\sigma\text{non-solvent} - \sigma\text{polymer}) > \sim \pm 6 \text{ cal}^{0.5}/\text{cm}^{1.5}$. In practice, allowable $\Delta\sigma$ s will only be positive since a non-solvent with a low value of $\sigma$ will not be water miscible, a prerequisite for a wet spinning process. Concentrations of strong non-solvents such as $H_2O$ ($\sigma24$), formamide ($\sigma19$) or glycerol ($\sigma18$) usually cannot exceed 15-20% of the solvent system. In comparison to the low tolerance of polymer solutions for strong non-solvents, higher concentrations of weak non-solvents can be incorporated. A weak non-solvent is defined as one with a $\Delta\sigma < \pm 6$ cal$^{0.5}$/cm$^{1.5}$. The suitable choices of strong non-solvents and weak non-solvents are dictated by the polymer of interest since $\Delta\sigma$ is a function of polymer. A more exact definition of formulation of the solvent system from which these membranes are produced is the generalized equation, below.

$$x[y+(1-y)]+(1-x)[z+(1z)]=1 \qquad (Eq. 1)$$

In Eq. 1, x is a variable weight fraction of the total solvent system, y is the weight fraction of weak non-solvent (WNS), z is the weight fraction of the strong non-solvent (SNS). $(1-y)$ and $(1-z)$ are the weight fractions of solvents $S_w$ and $S_s$ respectively. $S_w$ and $S_s$ must be capable of dissolving the polymer and may be the same or different. y and $(1-y)$ along with z and $(1-z)$ are determined experimentally to yield coagulation values between 0.0 and 4.0. These values are functions of the polymer/solvent/non-solvent system and will vary with the system. In examples 1 through 4 of Table 1, y was determined to be 0.43 at a coagulation value of 0.6, while z was determined to be 0.162 at a coagulation value of 0.6. Thus, when the membrane forming solution is formulated as the sum of the two fractions defined by x and $(1-x)$, the coagulation value remains at 0.6. Examples 1 through 4 further illustrate this method of formulating membrane-forming dopes or sols and the improvement in pressure failure rating of the resulting membranes as evidenced by the increased Maximum Pressure Before Failure (MPBF) test values obtained.

Improved asymmetric gas separation membranes having increased pressure strengths result from, for example, spinning or casting dopes comprised of glassy hydrophobic polymers, for example, aromatic sulfonate polymers, in a solvent system capable of forming complexes of acids and bases, wherein the non-solvent portion of the solvent system is comprised of a mixture of a weak non-solvent Lewis acid and a strong non-solvent. The acid:base complexes in the solvent system are capable of being readily disassociated by a polar coagulation medium. The invention is concerned with the preparation of efficient, high strength, asymmetric membranes having gas separation potential from various glassy hydrophobic polymers.

The membranes are a product of processes involving viscous dopes or sols which are close to the point of incipient gelation. The dopes preferably consist of an aromatic sulfone polymer, for example, polysulfone, polyphenylsulfone, polyethersulfone, and the like, dissolved in a solvent system consisting of acids, bases and acid:base complexes. The fact that the Hildebrand parameter of the solvent system is reasonably close to that of the polymer results in a fine and homogeneous sol and hence gel structures which have the potential for high gas separation efficiency. High sol viscosity and low coagulant tolerance, as reflected by the low g value, kinetically hinder densification of the gel and minimize the formation of macrovoids. At gelation, the acid:base complexes are rapidly disassociated by water or other polar coagulation medium into their small component molecules which, together with other components of the solvent system, are readily extracted during the gelation and washing steps. All of these factors act in concert to increase the rates of gelation and desolvation and to minimize densification, with the end result being the production of efficient, high strength, asymmetric membranes having gas separation potential.

DEFINITIONS

For the purposes of defining the invention, the following terms and phrases will have the meanings as set out below.

An asymmetric membrane has a thin skin and a thicker porous substructure, which skin exhibits maximum density at the surface which is furthest from the porous substructure. The separation membrane is essentially the same material throughout its structure, i.e., the asymmetric membrane is substantially chemically homogeneous. The material of the membrane exhibits selective permeation for at least one gas of a gaseous mixture over that of at least one remaining gas of the mixture, hence the membrane is defined as a "separation" membrane. By describing this separation membrane as "asymmetric", it is meant that the membrane has a thin, dense skin supported by a thick, porous substructure (matrix) in which both layers are formed from a single sol by a phase inversion process. The phase inversion process is a general process of membrane manufacture that utilizes a sol which inverts into two phases, prior to or simultaneously with gelation, at which time the sol is immobilized as a gel. The membranes of this invention have the potential to provide the separation of at least one gas from a gaseous mixture by interaction of the gas with the materials of the separation membrane.

The asymmetric membranes according to the invention realize their potential for separating gases when occlusively coated according to the teachings of Henis and Tripodi as follows.

The coating may be in the form of an essentially non-interrupted layer, i.e., an essentially non-porous layer, in contact with the skin of the membrane, or the coating may be discontinuous, or interrupted. The coating is referred to as an occluding coating since it occludes or plugs channels for non-selective gas flow, i.e., pores in the skin. Preferably the coating is not so thick as to adversely affect the performance of the membrane, e.g., by causing an undue decrease in flux or by causing such a resistance to gas flow that the separation factor of the coated membrane is essentially that of the coating. The coating may have an average thickness of up to about 10 micrometers.

A separation factor ($\alpha a/b$) for a membrane for a given pair of gases a and b is defined as the ratio of the permeability constant ($P_a$) of the membrane for gas a to the permeability constant ($P_b$) of the membrane for gas b. A separation factor is also equal to the ratio of the permeability ($P_a/l$) of a membrane of thickness l for gas a of a gaseous mixture to the permeability ($P_b/l$) of the same membrane to gas b, wherein the permeability for a given gas is the volume in cubic centimeters of gas at standard temperature and pressure (STP), which passes through a membrane per square centimeter of surface area, per second, for a partial pressure drop of 1 centimeter of mercury across the membrane per unit of thickness, and is expressed as $P/l = cm^3/cm^2\text{-sec-cmHg}$.

In practice, the separation factor with respect to a given pair of gases for a given membrane can be determined employing numerous techniques which provide sufficient information for calculation of permeability constants or permeabilities. Several of the many techniques available for determining permeability constants, permeabilities and separation factors are disclosed by Hwang, et al., *Techniques of Chemistry*, Volume VII, *Membranes in Separations*, John Wiley & Sons, 1975 (herein incorporated by reference) at Chapter 12, pages 296 to 322.

An intrinsic separation factor as referred to herein is the separation factor for a material which has no channels for gas flow across the material, and is the highest achievable separation factor for the material. Such a material may be referred to as being continuous or non-porous. The intrinsic separation factor of a material can be approximated by measuring the separation factor of a compact membrane of the material. However, several difficulties may exist in the determination of an intrinsic separation factor, including imperfections introduced in the preparation of the compact membrane such as the presence of pores, the presence of fine particles in the compact membrane, undefined molecular order due to variations in membrane preparation and the like. Consequently, the determined intrinsic separation factor can be lower than the intrinsic separation factor. Accordingly, a "determined intrinsic separation factor" as employed herein refers to the separation factor determined for a dry compact membrane of the material.

Coagulation value (g) is a measure of non-solvent tolerance or proximity to the point of incipient gelation (PIG) for a given polymer/solvent system combination. It is defined as the grams of water which, when added to 100 g of a sol containing 2 grams of polymer @30° C., will effect phase separation, J. Tsugaya and T. Miyano, *Jap. Pat. Publ.* 58-24,305 (1983). The lower the g value, the more rapidly a sol will gel when immersed in water, resulting in less gel densification. Furthermore, the lower the g value, the less likely will be the formation of macrovoids.

Cohesive energy density (CED) of a liquid is a measure of the forces holding the liquid together. Its most common unit is cal/cm$^3$. CED can be considered as an index of polarity, e.g., the higher the CED, the more polar is the liquid.

Hildebrand solubility parameter is expressed as $\sigma = (CED)^{0.5}$, having the units of cal$^{0.5}$/cm$^{1.5}$, and is a single value gauge of polarity, e.g., the higher the $\sigma$, the higher is the polarity. The $\sigma$ of a polymer is taken as the $\sigma$ of the fluid which effects the greatest swelling of a lightly cross-linked, insoluble sample of the polymer. The $\sigma$ of a polymer is typically precise to no better than about ± 0.2 units.

Dense, as in dense film, refers to the absence of voids > ~5 angstroms in diameter within the typical structure. However, the thin skins of integrally-skinned membranes, although dense on the whole, invariably contain a few large defects in the skin which must be sealed by an occluding coating material if intrinsic $\alpha$ is to be obtained.

An asymmetric or an integrally-skinned membrane is a two or more layered membrane of the general class first prepared by Loeb-Sourirajan consisting of a thin dense skin supported by a thick porous substructure (matrix) in which both layers are formed from a single sol by a phase inversion process.

First heat Tg is recorded at the first excursion of a differential scanning calorimetry (DSC) sample through the Tg range and may differ from that obtained in subsequent heats. If the first heat Tg is lower, the presence of residual solvent may be indicated.

Free volume (Vf) is the volume in a dense film which is available for gas permeation; $Vf = Vt - V_o$ where $Vt$ = total macroscopic volume and $V_o$ = volume occupied by vibrating macromolecules.

Glass transition temperature (Tg) is the temperature at which the thermal expansion coefficient of a polymer sample changes during the course of proceeding from the glassy to the rubbery state. The first heat Tg increases with increasing Vf.

Gutmann acid (AN) and base (DN) scales provide a numerical ranking of the relative strengths of Lewis acids and bases, respectively, as discussed by V. Gutmann, et al, *Monats Chem.* 106 1235 (1975) and 99 335 (1968).

Macrovoids are large (10-100 µm) diameter voids sometimes found within the sponge-like substructure, which normally consists of small 0.1-2 µm diameter open cells. The asymmetric membranes according to the invention are substantially macrovoid-free membranes. Macrovoids originate from sols which are metastable at the sol-gel transition as a result of being too fluid or too far removed from the point of incipient gelation (PIG) so that sol inhomogeneities can arise which are then frozen into the membrane structure after gelation, as discussed by R. E. Kesting, *Synthetic Polymeric Membranes, A Structural Perspective*, 2nd Edition, Wiley-Interscience, 1985.

Non-solvent, as used here, is a liquid which even when heated to ~ 100° C. will not dissolve more than a trace of the polymer. A weak non-solvent is defined as having $\Delta\sigma = (\sigma\text{non-solvent} - \sigma\text{polymer}) < \sim \pm 6$ cal$^{0.5}$/cm$^{1.5}$ and generally speaking, non-solvent tolerance increases as $\Delta\sigma$ decreases. A strong non-solvent conversely is defined as having a $\Delta\sigma > \sim \pm 6$ cal$^{0.5}$/cm$^{1.5}$.

Permeability coefficient (P) is the rate at which a gas traverses a membrane $$P = \frac{\text{vol thickness}}{\text{time area pressure}} = \frac{\text{cm}^3 \text{ (STP) cm}}{\text{sec cm}^2 \text{ cm Hg}}$$

Permeability is expressed as P/l (P÷thickness) to remove any uncertainties as to actual skin thickness (l).

"Potential" is the unrealized capacity for exhibiting a certain property. The potential for efficient gas separation means that the uncoated membrane has sufficient fineness and uniformity of structure and sufficient free volume in the skin, that after occlusive coating with a highly permeable polymer, defects will be occlusively sealed and the membrane will yield high permeability and approach intrinsic selectivity.

"Skin" is the thin (~2500Å) dense layer observable with a scanning electron microscope (SEM) which is found in integrally-skinned, asymmetric membranes. A skin can be of uniform density, in which case the skin and active separating layer are identical, or it can be of graded density, in which case the active layer thickness is less than the observable skin thickness.

Preferred hydrophobic materials or polymers, as used in this description, refer to water absorption values of between 0.02% and 1.0% after immersion in water for 24 hours of the materials or polymers, as determined by ASTM D-570 6.1 standards; however, it is possible that other hydrophobic materials and polymers with higher water absorption value could be formed into the membranes of this invention.

Wet process is variation of phase inversion, in which gelation occurs as the result of incompatibility which is effected by the immersion of the sol in a non-solvent coagulation medium such as water.

The following abbreviations are used throughout:
NMP = N-methyl-2-pyrrolidone
DMF = N,N-dimethylformamide
DMAC = N,N-dimethylacetamide
FP = 1-formylpiperidine
FA = formamide
PA = propionic acid
DMSO = dimethylsulfoxide
AA = acetic acid
PS = polysulfone
PES = polyethersulfone
PPS = polyphenylsulfone.

The maximum pressure before failure (MPBF) test is a test which determines the pressure at which a hollow fiber (HF) membrane ceases to effectively separate gases and is different from collapse pressure. The application of high pressure can damage the membrane structure of a HF membrane without complete collapse of the fiber and thus render it less efficient in operation. The damage can be the rupture of the membrane skin which results in the formation of low resistance gas channels or can be compaction of the porous structure which reduces transmembrane gas flux.

Ultrafiltration (UF) is that portion of the spectrum of pressure-driven membrane separation process which concerns itself with the separation of macromolecules from microsolutes or less successfully with the separation of macromolecules of different sizes. The pore diameter (d) range which is encountered in UF is $10A < d < 1000A$. The nature of the normal pores in UF membranes differs in kind from the nature of the normal pores which are encountered in gas separation membranes. In the latter the normal pores are only average interchain displacements (D) between macromolecules. This point is of importance because it must be realized that there is no necessary connection, inherency, between polymers and solutions which are useful for the preparation of the two types of membranes. Thus a list on non-solvents which may prove useful in the preparation of polysulfone (PS) membranes for UF may coincidentally contain one or more non-solvents which may also prove useful in the preparation of PS membranes for gas separations. In the case of Tsugaya et al, a list of non-solvents is given, most of which are unsuitable for use in the preparation of gas separation membranes. However, by coincidence, two non-solvents, acetic and propionic acids, are listed which are useful in the preparation of gas separation membranes. The great majority of the weak non-solvents listed in Tsugaya et al, result in membranes which do not have the potential for efficient separation of gases. Fundamental differences exist between gas separation and UF membranes and are as follows:

(1) Gas separation membranes have the potential for intrinsic $\alpha$s. This potential is realized when the membranes are occlusively coated with a highly permeable polymer such as a silicone. This potential is absent in the UF membranes because the latter contain large pores which cannot be occlusively sealed.

(2) Gas separation membranes are strong and substantially macrovoid-free with low water permeability; while UF membranes are fragile and macrovoid-ridden with high water permeability.

(3) There are also differences between the coagulation (g) values of the sols from which the respective membranes are made. Asymmetric separation membranes, especially those with graded density skins, are formed form sols having g values <2 (optimally <1.5). The UF membrane-forming sols of Tsugaya et al have g values >3 (optimally 3<g<7). Graded density skin membrane-forming sols have high percent total solids (TS) for sulfone polymers, for example, > ~30% TS and high viscosity > ~50,000 cps @70° C. (optimally $>10^5$ cps @70° C.) whereas Tsugaya et al, cite only sols with total solids ≦17% and viscosities ~2000 cps @23° C. Although Tsugaya et al, claim sols with total solids 5% <TS <40%, sols with concentrations substantially > those cited by example (~17%) will yield membranes with low permeability, which are useless for UF. Likewise, the concentrations of weak non-solvents cited in Tsugaya et al, are much lower than those cited for the instant process. In fact, Tsugaya et al explicitly exclude sols with g values <2 (polysulfone) and <1.5 (polyethersulfone). Although one example (#12 Table 2) of Tsugaya et al indicates a g value of 1.7 for polysulfone, this value is actually 3.7 based on reproduction of the teachings of Tsugaya's example 12. Several other examples of Tsugaya et al were also reproduced and found to be correct. The principal point, however, is not the g value per se which is after all "a working figure", but rather the fact that low viscosity UF membrane forming sols require a higher g value in order to allow time for some densification prior to gelation, to increase the strength of what would otherwise be a friable gel, whereas the high viscosity gas separation membrane-forming sols require rapid and immediate gelation to avoid densification. Thus, the requirements for g values are opposed to one another for UF and gas separation membrane-forming sols. Low g values are precisely those which are of critical importance with respect to the preparation of gas separation membranes with the potential for intrinsic $\alpha$. Likewise, some of the non-solvents cited by Tsugaya et al, are too volatile (metyl and ethyl formates) or too insoluble in either the organic solvent or water (benzoic and trimellitic acids) to be useful in the preparation of useful gas separation membranes. Two of the "non-solvents" listed, trimethyl phosphate and triethyl phosphate are actually solvents for polysulfone.

MODERN ERA OF MEMBRANOLOGY

A good general reference for membrane technology which is incorporated herein by reference is *Synthetic Polymeric Membrane, A Structural Perspective*, 2nd Edition, Wiley-Interscience, 1985 by R. E. Kesting. Since the beginning of the modern era of membranology starting about 1960, a primary concern has been the necessity for decoupling permeability (P) from selectivity, i.e., separation factor ($\alpha$). P and $\alpha$ for dense films of a given polymer and in another aspect for asymmetric films of a given polymer are usually considered coupled, that is, if P is specified, $\alpha$ is determined and vice versa. This concept, at first consideration, suggests that dense films, for example of glassy polymers, possess "intrinsic" P's and $\alpha$'s. However, since the glassy state is a non-equilibrium condition, any intrinsic value will be strongly dependent on sample history, so that the concept loses significance except within narrowly defined limits.

In the sections which will follow, both the product membranes and a process for preparing same, including the natures of the sols which exist prior to gelation, are described. Hereinafter, the graded density skinned membrane and processes for preparing the membrane are referred to as "P1". Although the interpretations which follow are plausible and even probable, due to the complicated systems and sciences involved, it is impossible to exclude every alternative explanation. The interpretations given here are to teach the inventive findings in a reasonable and logical manner.

DETAILED DESCRIPTION OF THE INVENTION

The hollow fiber membranes produced according to the invention have higher gas separation factor and increased maximum pressure before failure (MPBF) than attainable using N-methyl-2-pyrrolidone/propionic acid or other solvent systems utilized for producing asymmetric gas separation membranes having graded density skins, high free volume, i.e., P-1 membranes. The membranes of the present invention are produced from a solvent system formulated using a weak non-solvent Lewis acid along with a strong non-solvent to achieve the improved membrane properties. For example, formamide, a traditional non-solvent, forms a strong complex with propionic acid, a P-1 membrane non-solvent, and thus competes with N-methyl-2-pyrrolidone for the propionic acid. The resulting improved P-1 membrane achieves increased separation factor and increased MPBF through utilization of a dual non-solvent/solvent system in formulating the spinning dope.

In a broader sense the invention is concerned with the production of hollow fibers with improved permeability and improved separation factor along with increased failure pressure. These fibers are produced from solvent systems formulated using a solvent and two non-solvents. These two non-solvents are chosen, one each, from non-solvents grouped according to non-solvent strength, (i.e., one strong non-solvent and one weak non-solvent). All non-solvents form complexes with the solvent and/or the other non-solvent. A partial list of non-solvents both weak and strong, in the case where polysulfone is the polymer of interest, is as follows: weak non-solvents are comprised of, for example, acetic acid, propionic acid, butyric acid, isobutyric acid, ethyl lactate, N-methylacetamide, and N-methylformamide; strong non-solvents are comprised of, for example, water, formamide, ethylene glycol, glycerine, and lactic acid.

In the case of dense films and in the case of the skins of integrally-skinned membranes, gas molecules permeate by diffusion between polymer chains. The greater the free volume, the more rapidly gas molecules diffuse through the membrane, hence the higher the permeability (P or P/l). Free volume is thus a measure of the looseness of packing of the membrane polymer macromolecules. The Vf fraction of a glassy polymer is typically 0.025 at the Tg as determined by S. Matsuoka, *Polymer Engineering and Science*, 21 (4), 907 (1981). In other words, only about 1/40 of the total volume of a typical dense glassy polymer consists of free volume. However, free volume is not limited to a precisely fixed or intrinsic value since the glassy state is a non-equilibrium condition. Therefore, since P or P/l is related to free volume, P and P/l are also variable. It follows that there is no intrinsic P or P/l for a given glassy polymer except within narrowly defined limits.

The glassy state can be approached either by cooling a melt or a rubber or by gelling a sol. Kinetic factors influence the magnitude of free volume obtained. As a melt or rubber cools or a sol gels, viscosity increases. Theoretically, at a value of 51.6° C. below the Tg the viscosity becomes infinite and free volume is fixed at whatever value is obtained at that point. The faster the glassy state is attained, the less time the macromolecules have for rearrangement and densification and the higher will be the free volume.

Quantitative determinations of free volume are accessible with difficulty since free volume is such a small fraction of the total volume of a glassy polymer and because precise density measurements to discern small differences are difficult to obtain. Fortunately, differential scanning caliormetry (DSC) presents a straightforward method of ranking membrane free volumes since the first heat Tg increases with increasing free volume (S. Matsuoka). Because gelation and desolvation of the entire fiber takes place rapidly, it is assumed that the Tg of the fiber as a whole is essentially equivalent to the Tg of the skin. It should be realized that both the high free volume and the telltale high first heat Tg will only be present for the first heat excursion of a high free volume glass through the Tg as correlated by Matsuoka. After such a glass has been heated to a temperature above the Tg and is then cooled, some of its free volume will have vanished. If reheated, it will attain only lower Tg values characteristic of bulk samples of the polymer.

Until recently, only two options were available to increase the free volume in a given glassy hydrophobic polymer utilized for gas separation membranes. First, membrane density can be decreased and free volume increased through swelling the membrane by exposure to $CO_2$ under pressure. Carbon dioxide under pressure acts as a swelling agent and at very high pressure, it can even act as a supercritical liquid solvent, thus the $CO_2$ lessens polymer-to-polymer interaction allowing the macromolecules to move farther apart from one another. For example, Erb and Paul, *J. Membrane Sci.*, 8, 11 (1981) illustrated that the $CO_2$ absorption of melt extruded polysulfone film is increased by exposure to $CO_2$ to 60 atm. Although not explicitly stated by Erb et al, increased $CO_2$ absorption was probably due to increased free volume. Secondly, the macromolecular polymer chains can be chemically modified so as to inhibit close chain packing. Chern et al, *Materials Science of Synthetic Membranes*, ACS symposium Series 269, D. Lloyd, ed. 1985, p. 40, showed that whereas films prepared from polysulfone which utilizes bisphenol A exhibits a P for $CO_2$ of $4.4 \times 10^{-10} cm^3 (STP) cm/cm^2 sec\ cm\ Hg$, films prepared from polysulfone made with tetramethyl bisphenol A have a P for $CO_2$ of $21 \times 10^{-10} cm^3 (STP) cm/cm^2 sec\ cm\ Hg$. The methyl groups in the latter modified polymer sterically inhibit a close approach between neighboring chains, thereby increasing free volume and permeability coefficient.

Although both of the above approaches have been successfully applied to thick dense films, the practicality of their application to integrally-skinned membranes is uncertain. For example, $CO_2$ might densify the porous matrix of an asymetric membrane, thereby adding to overall resistance by increasing effective skin thickness or by densifying the entire porous substructure of the effect of $CO_2$ treatment might not be stable enough to be of practical utility. On the other hand, polymer modification as in the second approach is an expensive proposition and can be accompanied by losses of physical properties such as strength. Nevertheless, this latter approach has been the one most favored by other researchers as opposed to the present invention, wherein the structure of a polymeric membrane is modified through, for example, acid:base complex solvent dope formulation which provides changed improved morphology and strength in the formed asymmetric membranes upon gelation in a polar medium.

Until now, however, attempts to increase permeability while maintaining skin integrity in asymmetric or integrally-skinned membranes of glassy, hydrophobic polymers, for example, aromatic sulfone polymers have been unsuccessful. Because glassy, hydrophobic polymers, the class most suitable for gas separation membranes, have much stronger polymer-polymer interaction than polymer-water interaction, it is difficult to control densification when sols of such polymers are gelled in water. This leads to integrally-skinned membranes whose skins have relatively low free volumes and hence low permeabilities. To retard densification and thereby to retain higher permeabilities, Cabasso et al, *J. Appl. Polym. Sci.*, 20, 2377, (1976); 21, 165 (1977), immersed water-gelled polysulfone, ultrafiltration membranes in concentrated sulfuric acid. Tweddle et al, *Ind. Eng. Chem.*, Prod. Res. Dev., 22 320 (1983) carried this approach a step further and gelled NMP solutions of polysulfone in 25% aqueous sulfuric acid. Because the acid neutralized the basic solvent, NMP, densification was retarded and increased permeability was obtained. The interaction between sulfuric acid and the weakly basic solvent NMP apparently greatly decreases the solvent power of NMP, minimizes the capacity of residual solvent for affecting plasticization and densification and could account for the increased permeability.

A major factor throughout the development of the P1 membranes was realization of the importance of acid:base complexes in solvent mixtures employed in the dopes. In concert with studies on glassy-state structure and spinning technique development, study also focused on the nature and extent of complex formation processes in the solvent/non-solvent mixtures themselves. Such studies included various spectroscopic and thermochemical probes aimed in part at distinguishing the more promising P1 type solvent systems from more traditional non complexing solvent/non-solvent systems. Complexes of the Lewis acid and Lewis base of the appropriate strength and in sufficient concentration are important. Also important are solvency characteristics relative to the given polymer. Neither of these physical elements alone is sufficient to yield optimum membrane transport properties. For example, solvent systems containing formamide mixed with basic solvents such as NMP and FP, which represent certain stages of the prior art in terms of their solvency characteristics, do in fact form very weak complexes. However, such weak complexes do not form a P1 type membrane from the coagulation spinning processes. Clearly, the combined effect of complex strength and solvency characteristics is important in the present invention.

Phase inversion essentially involves the structuring of a sol, with the desired degree of swelling and order, and the subsequent immobilization of the sol into a gel with a corresponding degree of swelling and order. In the present instance of high viscosity, high ($> \sim 30\%$) total solids sol with low ($<2$) g values, there is a very close correspondence between sol structure that exists immediately prior to and following gelation. Gelation and desolvation take place very rapidly, which helps to avoid sol inhomogeneities that lead to macrovoids, thus minimizing densification owing to plasticization and allows skin density gradients to arise and to be maintained. Since the gel structures for this invention exhibit the potential for intrinsic $\alpha$ s, it can be deduced that the sols are extremely fine and uniform, so that the resultant gels also exhibit these traits, and contain a minimum number of small occlusively sealable defects. An understanding of the origin of fineness and uniformity of the sol state requires consideration of deductions based on polymer solution theory and a number of empirically established principles, as discussed below.

The stronger the polymer-solvent interaction and conversely the weaker the polymer-polymer interaction, the finer and more uniform will be the dispersion of macromolecules or aggregates of macromolecules in a given sol.

Sols based solely on polymer and solvent generally gel and desolvate too slowly to produce membranes with the potential for efficient separations such as, for example, improved asymmetric membranes according to the invention.

The addition of non-solvents to the sol decreases gel density which lessens the resistance to gas permeation of the resultant formed membranes.

Insofar as optimum gas separation membranes are concerned we have determined empirically that the potential for high permeability and selectivity and high strength is not simply a matter of choosing a non-solvent with the appropriate $\Delta\sigma$. A preferred process for forming the membranes according to the invention utilizes a solvent system which also contains a high concentration of acid:base complex.

The formation of acid:base complexes can be written:

$$A+B=A:B$$

where A is the acid, B the base, and A:B is the complex. Most commonly B is a solvent and A is a non-solvent, for example, N-methyl pyrrolidone (NMP) a solvent for polysulfone (PS) and propionic acid (PA) a weak non-solvent. For membranes of the present invention this expression is more properly written:

$$A+B+C=A:B+A:C \text{ (where C is basic)}$$

or $$A+B+C=A:B+B:C \text{ (where C is acidic)}$$

where C is the strong non-solvent as previously defined. In the example presented above where A is PA and B is NMP, C could be a basic strong non-solvent such as FA or an acidic strong non-solvent such as lactic acid.

The efficiency of a membrane gel appears to bear a relationship to the compatibility of the polymer in the solvent system (SS) provided the solvent system contains a high concentration of acid:base complex. Here compatibility is considered proportional to $\Delta^{-1}$ where $\Delta = |\sigma \text{ ss} - \sigma \text{ polymer}|$. For example, for the membrane polymer PS ($\sigma$ 10.55), the highest efficiency membranes are obtained when the $\Delta \leq \sim 1.3$ cal$^{0.5}$/cm$^{1.5}$ and not as great efficiencies are obtained for $\Delta > \sim 1.5$. The utilization of solvent systems which do not form strong acid:base complexes results in less efficient membranes even when the $\Delta$ is such as to indicate a high degree of compatibility.

It is hypothesized that this difference between the efficacy of sols which contain acid:base complexes and those which contain solvents and non-solvents which form only weak complexes or no complexes lies in the greater uniformity on the molecular level of the former. The acid:base complexes exist in equilibrium with uncomplexed acid and uncomplexed base and possibly act to render compatible any uncomplexed acid and base in much the same manner as a graft copolymer of polymer 1 and polymer 2 acts to render compatible a mixture of polymers 1 and 2.

In the absence of strong interactions between non-solvent and solvent, weak thermally labile complexes may form or perhaps oligomeric clusters of non-solvents may persist which may lead to sol nonuniformity and ultimately to gel nonuniformity. The existence of weak complexes and/or non-solvent clustering may have the effect of leaving solvent molecules freer to engage in polymer-solvent interactions with adverse effects on the rates of gelation and desolvation. According to this point of view, the role of the acid:base complex is to maximize sol compatibility and uniformity at the molecular level without, at the same time, permitting an increase in polymer-solvent interaction.

The properties of the acid:base complexes will now be considered. The ranking of the strengths of Lewis acids and bases has been effected by V. Gutman, et al., *Monats Chem.*, 106 1235 (1975) and 99 335 (1968) in his acceptor number (AN) and donor number or donicity (DN) series, respectively. The strength of acid:base complexes can also be estimated from the magnitude of the infra-red (IR) frequency shifts ($\Delta \nu$) of the carbonyl (C=O) bands of amides or in the case of DMSO and triethylphosphate (TEP) of the shifts of the S=O and P=O bands, respectively, such IR band shifts being observed in IR spectra comparing mixtures of acids and bases with the spectra of pure bases.

Acids which yield the most useful complexes appear to fall in the range $\sim 47 < AN < \sim 63$. However not every Lewis acid in this range forms a useful complex. Glycerol, for example, although exhibiting an AN of 49.4 has only a modest $\Delta \nu$ of $\sim -15$ cm$^{-1}$ whereas useful acids have a $\Delta \nu$ of $\sim -25$ to $-38$ cm$^{-1}$. All useful acids identified to date are not only Lewis acids (electron pair acceptors) but also Bronsted-Lowry acids (proton donors). However, even in this category many ineffective species are encountered. Too strong an acid such as $H_2SO_4$ yields an acid:base complex which is not only poorly compatible, but which will not readily dissociate in water and hence will be poorly washed from the membrane. Inadequate water solubility (benzoic and glutaric acids) results in inefficient removal and hence in poor membrane performance. Acceptable acids for aromatic sulfone polymers have $12 < \sigma < 13.5$ optimally $12 < \sigma < 12.5$. Of these propoinic acid, butyric acid, isobutyric acid and acetic acid are preferred.

The Lewis bases used in dopes from which are produced efficient gas separation membranes from aromatic sulfone polymers appear to have $26 < DN < 30$, preferably, $27 < DN < 28$, and $11 < \sigma < 12$ which makes the $\Delta$ ($\sigma SS - \sigma polymer) < 1.5$ cal$^{0.5}$/cm$^{1.5}$. This group includes the amide solvents NMP, DMAC, FP, (N-methyl piperidine, N-methyl caprolactam). The species in parentheses are not commercially available, but because of their close relationship to NMP, it is felt that they would also be acceptable bases. The $\sigma$ values for the aromatic sulfone polymers are taken as: Udel® polysulfone (10.55), Radel® polyphenylsulfone ($\sim 11$) and Victrex® polyethersulfone ($\sim 11.5$).

The kinetics of gelation and desolvation are an important practical consideration in the design of a particular sol for use in the process, because the amount of free volume retained depends on how rapidly the sol viscosity increases sufficiently to effect gelation and how rapidly the solvent is removed from the gel, thus minimizing post-gelation densification. The closer the sol is to the thermodynamic point of incipient gelation (PIG), the more rapidly gelation occurs and the higher will be the retained free volume. The PIG for a given polymer in a given solvent system is a function of temperature. For a given polymer at a given dope temperature, the PIG will vary according to the chosen solvent system. A convenient test for gauging proximity to the PIG is the coagulation value (g), which is defined as the grams of water, which when added to 100 g of a 2% solution of the polymer in the chosen solvent system at 30° C., will cause phase separation (turbidity).

For UF membranes, where low total solids (TS) dopes of low viscosity are utilized (and the resultant macrovoids are permissible), a g value optimally between 3 and 7 is preferred. This is the case because in low TS sols, gelation is deliberately retarded so as to allow densification and strengthening of what would otherwise be an extremely fragile gel. Retarded gelation and low viscosity lead to sol inhomogeneities which in turn lead to the formation of macrovoids.

For gas separation membranes, however, where the presence of macrovoids is detrimental (particularly regarding pressure strength), g values $<2$ in the case of PS are preferred (optimally $0 < g < 1.5$). A lower g is required for gas separation membranes than for UF membranes because gelation must be extremely rapid to prevent the formation of the sol inhomogeneities which can lead to the formation of macrovoids and large unsealable surface pores or defects. For the same reason, sol viscosity and total solids must be higher in dopes used for preparation of gas separation membranes. All of these interrelated parameters act to minimize the formation of sol inhomogeneities and macrovoids.

The fact that a high acid:base molar ratio and consequently a low non-solvent tolerance (low g value) must be present to ensure optimum results for gas separation membranes can be seen from Table 3. For the case of PS sols in PA:NMP the best results, i.e., highest $O_2P/ls$ plus highest $\alpha O_2/N_2$, are obtained when the ratio of acid to base lies between approximately 0.75 and 1.1 with g values $<2$. It should also be noted that reproducibility suffers at lower acid:base ratios. This is a result of the higher g values, which lead to sol inhomogeneities during the sol-gel transition. However, for PS and other polymers in other solvent systems, the optimum value of the acid:base ratio may be lower if the solvent power or solvency of the acid:base complex is insufficient to permit the preparation of high TS sols due to limited polymer solubility in such solvent systems.

The reinforcing roles of high viscosity, high TS, high acid:base ratio and low g value are necessary to eliminate macrovoids and provide asymmetric membranes with potential for efficient gas separation membranes with improved pressure strength. In an earlier disclosure aimed at producing UF membranes, a 17% TS dope with PA/NMP molar ratio 0.44 was used to prepare macrovoid-containing UF membranes. HF membranes spun from this same sol contained a high population of macrovoids and were found completely unsuitable for gas separations. At this low PA/NMP ratio even when the TS are increased to 32% and even 37%, $\alpha$ remained low. It follows that high TS, high viscosity dope and a high complex acid:base ratio are all required to produce substantially macrovoid-free PS fibers which are suitable for gas separations. The g value (non-solvent tolerance) of 4.4 for the acid:base ratio of 0.44 of this UF dope is considerably greater than the optimum g<2.0 for gas separation membranes.

Membranes having improved strengths can be produced from various processes and polymers; however in this invention the membranes are produced from the acid:base complex solvent system dopes of aromatic sulfone polymers. The first heat Tgs of membranes made from sols containing acid:base complexes are substantially higher than those prepared from sols containing noncomplexing non-solvents.

The typical structure of the skins of integrally-skinned gas separation membranes prepared by a phase inversion process is similar either to that of thick dense films or of dense films with a density gradient. However, the skin of such membranes usually contain a small number of surface defects or pores. It has been established empirically that the present membranes possess the potential for intrinsic α, such defects being sealable by known occlusive coating techniques (Henis and Tripodi).

EXPERIMENTAL DETAILS

All of the hollow fibers recorded in the following tables were spun by a standard wet spinning process. Deaerated sol (dope) was delivered at a rate of up to 20 ml/min to a tube-in-orifice type spinnerette. The spinnerette was maintained at a temperature between 15°–100° C. by the application of sufficient heat to maintain adequate sol flow. Water was injected into the fiber lumen at a rate of up to 10 ml/min to form the nascent hollow fiber which was drawn at a rate of up to 100 m/min. The fiber is drawn through water baths maintained at temperatures of up to ambient and above, but less than about 50° C. The hollow fiber is then washed with water. The fiber is then wound onto a bobbin and washed for up to 7 days in running water. Hanks of hollow fiber were then formed by skeining the fiber from the bobbin. These hanks were hung vertically and dried rapidly at about 100° C. in air.

Using experimental procedures analogous to those of Gutmann, U. Mayer, V. Gutmann and W. Gerger, *Monats. Chemie*, 106, 1235 (1975), AN values were determined from $P^{31}$ NMR measurements of $(C_2H_5)_3PO$ dissolved at low concentrations in various acidic compounds. Spectra were recorded on a Varian Instruments XL-200 Fourier Transform NMR Spectrometer, operating at 81 MHz for detection of phosphorus-31. Broad band proton decoupling was used to collapse the $P^{31}$ multiplet signal of $(C_2H_5)_3PO$ to a single peak, whose spectral position reflects the degree of interaction between $(C_2H_5)_3PO$ and a given acidic sample compound. Peak positions were corrected for differences in bulk diamagnetic susceptibility between samples and were reproducible to better than 0.1 ppm.

Using experimental procedures analogous to those of Gutmann, V. Gutmann and A. Scherhaufer, *Monats. Chemie*, 99, 335 (1968), DN values were determined calorimetrically from the exothermic enthalpy ($-\Delta H$) of interaction between the basic sample compound and antimony pentachloride, in dilute solution in 1,2-dichloroethane at 25° C. Measurements were run on a Setaram Model C80 Heat Flux Calorimeter, using a two compartment mercury sealed cell. Thermal data were analyzed using Astra Scientific software programs for digital integration of the heat flux signals.

Membrane test cells (test loops) consisted of 10 hollow fibers each 10 to 15 cm in length, that had been occlusively coated with a 1% polydimethylsiloxane solution in isopentane. Cells were subjected to increasing gas pressure in steps using an oxygen/nitrogen feed gas mixture. The permeate flow at atmospheric pressure was monitored for both total flow and oxygen concentration. Feed gas pressure was increased in $1.38 \times 10^6$ Pa increments until a rapid increase in permeate flow was observed and/or a >3% decrease in permeate oxygen concentration occurred at a given increment of pressure, either change being indicative of the upper limit of pressure strength of the hollow fiber membrane sample. The results shown under MPBF in Table 1 are the highest pressure achieved for test cells without either of these changes occurring and are the average of 4 to 8 individual test cell measurements.

Permeability results are from two types of HF test cells that differ only in size. The heading "test cell size" in Table 1 differentiates these two sizes. Test loop designates small test cells consisting of 10 hollow fibers each 10 to 15 cm long, while 1 ft. designates larger test cells consisting of ~1200 hollow fibers each ~30 cm long. Results listed for test loops are the average of 4 to 8 individual tests. All test cells were occlusively coated with a 1% polydimethylsiloxane solution in isopentane. Occlusively coated test cells were placed in a pressure vessel and helium and nitrogen flux rates were measured at ambient temperature (22°–30° C.) and at pressures from 100 PSIG ($7.91 \times 10^5$ Pa) to 600 PSIG ($4.24 \times 10^6$ Pa) using pure helium and nitrogen in separate respective tests. Permeability was calculated using the equation:

$$P/l = \frac{Q \times C.F. \ (14.7 \ psi/atm)}{n \ dt \ \Delta p (76 \ cmHg/atm) \ (60 \ sec/min)}$$

where Q=the apparent gas flow reading from a mass flow meter (cm³(STP)/min); CF=a flow meter conversion factor for the specific gas to change the apparent flux to the actual flux; n=the number of fibers; d=the outer diameter of the fiber (cm); t=active fiber length (cm); P=permeability of the skin layer; and l=the thickness of the effective layer; and Δ=the partial pressure difference of the gas across the membrane.

The separation factor (α He/N₂) is the ratio of the (P/l)'s as shown in the equation:

$$\alpha \ He/N_2 = \frac{(P/l)He}{(P/l)N_2}$$

Oxygen permeability and the separation factor for oxygen/nitrogen were determined using 1 ft. test cells. These test cells were in each case sealed in a pressure vessel capable of maintaining a flow of a $O_2/N_2$ gas mixture over the external surface of the hollow fibers of the module at a desired feed pressure, typically 200 PSIG ($1.48 \times 10^6$ Pa). The vessel was immersed in a thermostated bath and held at 50° C. during testing. The bores of the fibers in the test cell were maintained at atmospheric pressure and the permeate flow was determined using a mass flow meter calibrated for air. Oxygen concentration in the permeate, the non-permeate and in the test gas mixture was determined using a Servomex ® oxygen analyzer, accurate to ±0.1% concentration. High pressure feed gas flow was monitored and maintained at >100 times the permeate flow. Permeability was calculated using the equation: $(P/l)O_2 = Q[O_2]/\Delta p\, A$ where Q is the permeate flux in standard cubic centimeters per second, $[O_2]$ is the concentration of oxygen in the permate, $\Delta p$ is the difference in oxygen partial pressure across the membrane in cmHg, and A is the membrane area in $cm^2$. Nitrogen permeability is calculated in the corresponding manner as described for oxygen permeability.

The separation factor for oxygen/nitrogen is the ratio of the oxygen to nitrogen permeability as shown by:

$$\alpha\, O_2/N_2 = \frac{(P/l)O_2}{(P/l)N_2}$$

A solvent spinning solution for the production of the improved membranes of the present invention are formulated as the mixture of two different dopes, each containing a single non-solvent at a level sufficient to give a desired coagulation value and being a variable portion of the whole dope. A convention presently used to identify the formulation is that of identifying the weight fraction of the dope portion based on the weak non-solvent, for example, propionic acid. Thus, P.5 is a dope composed of two dopes each 50% by weight of the total dope and each formulated to give a coagulation value of about 1.

Table 1 illustrates the use of the generalized equation (Eq. 1) in formulating solvent systems for the production of the improved inventive membranes from Udel ® P3500 polysulfone. Examples 3 and 4 illustrate the improvement obtained in MPBF and selectivity for membranes produced from the solvent systems of the present invention as compared to Example 1.

Table 2 gives permeability results obtained from polysulfone membranes produced with acid:base complexing solvent systems. DN numbers are given for the Lewis base solvents in each case, along with the solubility parameters for the solvent system ($\sigma_{ss}$). These results illustrate the usefulness of these membranes in oxygen/nitrogen separation and the enhanced permeability obtained when the Lewis base was $27 < DN < 28$ and the solvent system $|\Delta| \leq 1.5$.

Table 3 demonstrates the higher first heat Tg values obtained for membranes produced utilizing the acid:base complex solvent system PA/NMP as the molar ratio of PA/NMP is increased. First heat Tg values that are higher than the Tg of the bulk polymer (PS Tg = 190°–191° C.) are indicative of the higher free volume imparted to the membrane by the use of the complexing solvent system at g values less than about 2.

Demonstrated by Table 4 is the improvement in both the permeability and separation factors for a membrane produced from the complexing PA/NMP solvent system over a state of the art membrane produced from only weakly complexing FA/FP solvent system.

TABLE 1

Effect on Udel ® P3500 Fiber Properties of the addition of strong Nonsolvent FA to the acid:base complex PA/NMP Solvent System

DOPE FORMULATION

| Example | Fraction Non-Solvent weak x | Fraction Non-Solvent strong (1−x) | Solvent Formulation** FA wt % | Solvent Formulation** PA wt % | Solvent Formulation** NMP wt % | Wt. % Polymer |
|---|---|---|---|---|---|---|
| 1 | 1.0 | 0 | 0 | 43 | 57 | 37 |
| 2 | .8 | .2 | 3.2 | 34.4 | 62.4 | 38.3 |
| 3 | .5 | .5 | 8.1 | 21.5 | 70.4 | 37 |
| 4 | .45 | .55 | 8.9 | 19.4 | 71.7 | 37 |

PERMEABILITY RESULTS

| Example | (P/l) Hex 10^6 | He α N_2 | Test Pressure (Pa × 10^−6) | Test Cell Size | MPBF Test (Pa × 10^−6) |
|---|---|---|---|---|---|
| 1 | 152 | 85 | 4.24 | test loop | 10.1 |
| 2 | 132 | 74 | .79 | 1 ft. | 9.8 |
| 3 | 102 | 78 | .79 | 1 ft. | 12.5 |
| 4 | 87 | 114 | 4.24 | test loop | 13.9 |

*As per Equation 1
**Calculated from Equation 1 where WNS is PA and y = .43 when g = 0.6, and SNS is FA and z = .162 when g = 0.6, and $_wS$ and $S_s$ are NMP.

TABLE 2

$\sigma\,ss$ Values of Solvent Systems and $\Delta$ Values of Sols for 37% TS Polysulfone Dopes Containing Acid:Base Complexes Versus Membrane Air Separation Characteristics

| Complex | DN | Acid:Base Ratio (% W/W) | $\sigma\,ss$ (cal$^{0.5}$/cm$^{1.5}$) | $\Delta$ (cal$^{0.5}$/cm$^{1.5}$) | $O_2$ P/l (× 10$^6$) | $\alpha_{N_2}^{O_2}$ |
|---|---|---|---|---|---|---|
| PA:DMAC | 27.8 | 30/70 | 11.09 | 0.54 | 29.6 | 4.8 |
| PA:NMP | 27.3 | 43/57 | 11.83 | 1.28 | 43 | 5.2 |
| AA:NMP | 27.3 | 38/62 | 11.65 | 1.10 | 16.2 | 4.9 |
| PA:FP | 27.0 | 38/62 | 11.75 | 1.20 | 24.7 | 5.2 |
| PA:DMSO | 29.8 | 7/93 | 12.17 | 1.62 | 9.0 | 5.2 |
| PA:DMF | 26.6 | 25/75 | 12.04 | 1.49 | 26.2 | 3.7 |

TABLE 3

Effects of Varying PA Concentration in 37% TS Udel ® 3500 Polysulfone/NMP Dopes upon Dope and Membrane Properties

| (Molar Ratio) | PA/NMP (% W/W) | Dope Properties Viscosity (CPS @ 70° × 10$^{-5}$) | Dope Properties g value (g) | Membrane Properties First Heat Tg (°C.) | Membrane Properties $O_2$ P/l (× 10$^6$) | $\alpha_{N_2}^{O_2}$ |
|---|---|---|---|---|---|---|
| 1.09 | 45/55 | 1.20 | 0.15 | 197 | 45.9 | 4.6 |
| 1.00 | 43/57 | 1.13 | 0.6 | 195 | 43.0 | 5.2 |
| 0.89 | 40/60 | 1.07 | 1.1 | 197 | 33.0 | 4.4 |
| 0.72 | 35/65 | — | 2.1 | 197 | 25 | 4.8 |
| 0.42 | 26/74 | — | 2.9 | 187 | 16.3 | 4.3 |
| 0.33 | 20/80 | 0.57 | 4.5 | 187 | 29.6 | 2.6 |

TABLE 4

Comparison of Transport Properties[a] for Various Gases For PI versus Non-PI Fibers

| | P/l He (× 10⁻⁶) | $\alpha_{N_2}^{He}$ | P/l H$_2$ (× 10⁻⁶) | $\alpha_{N_2}^{H_2}$ | P/l CO$_2$ (× 10⁻⁶) | $\alpha_{CH_4}^{CO_2}$ | $\alpha_{C_3H_8}^{CO_2}$ | P/l O$_2$[b] (× 10⁻⁶) | $\alpha_{N_2}^{O_2}$ |
|---|---|---|---|---|---|---|---|---|---|
| Polysulfone Udel 37% TS | | | | | | | | | |
| PI 43/57 PA/NMP | 170.0 | 91.0 | 258.0 | 126.0 | 145.0 | 9.8 | 85.0 | 43.0 | 5.2 |
| 87/13 FP/FA | 75.0 | 90.0 | 80.0 | 100.0 | 65.0 | 9.5 | 80.0 | 12.0 | 5.2 |

[a]Oxygen and nitrogen data obtained at 50° C., feed air (79/21 O$_2$/N$_2$), 2.0 × 10$^4$ Pa differential pressure. Helium, nitrogen, and hydrogen data obtained in pure gas tests at 20-14 24° C., 2.17 × 10$^6$ Pa differential pressure. Hydrogen tests were run using procedures analogous to those for He and H$_2$. CO$_2$/CH$_4$/C$_3$H$_8$ data obtained at 75° C., 2.17 × 10$^6$ Pa differential pressure feed (CO$_2$ 30%, CH$_4$ 66%, C$_3$H$_8$ 4%). CO$_2$/CH$_4$/C$_3$H$_8$ tests were run using gas chromatography for compositional analyses and calculations were analogous to those employed for O$_2$/N$_2$ tests. All samples were in test loops containing 10 fibers × 15 cm length, coated with 1% Sylgard in isopentane solution using bore vacuum. Values of P/l and α are averages of from 2 to 6 test loops in each case.
[b]Test data for O$_2$/N$_2$ obtained from 1" × 1' modules containing ~ 1000 fibers × ~ 26 cm length.

We claim:

1. A process for forming a hollow-fiber, asymmetric, substantially macrovoid-free membrane with potential for gas separation which exhibits increased failure pressure strength, the membrane being comprised of a glassy hydrophobic polymer, the process, comprising:
   (a) dissolving the polymer in a solvent system comprised of a strong non-solvent, a weak non-solvent Lewis acid, a solvent Lewis base and a complex formed of Lewis acid and Lewis base, wherein the solvent system has a Hildebrand solubility parameter within about 1.5 cal$^{0.5}$/cm$^{1.5}$ of the Hildebrand solubility parameter of the polymer, to form a spinning dope containing at least 30% by weight total solids of polymer;
   (b) spinning the dope through the orifice of a tube-in-orifice type spinnerette;
   (c) injecting coagulation fluid through the tube of the spinnerette;
   (d) coagulating the spun dope in a coagulation medium and forming the membrane;
   (e) desolvating the formed membrane by washing the membrane in a polar medium; and
   (f) drying the membrane at a temperature from about ambient to about 50° C. below the glass transition temperature of the polymer.

2. The process according to claim 1, wherein the strong non-solvent has a Δσ greater than about ±6 cal$^{0.5}$/cm$^{1.5}$ and the weak non-solvent Lewis acid has a Δσ of less than about ±6 cal$^{0.5}$/cm$^{1.5}$.

3. The process according to claim 1, wherein the Lewis acid, Lewis base acid:base complex provides a solvent system wherein the solvent system has a concentration of weak non-solvent Lewis acid and strong non-solvent sufficient to lower the coagulation value (g) to less than about 2.

4. The process according to claim 1, wherein the Lewis acid is comprised of monocarboxylic acids having from 2 to 4 carbon atoms per molecule.

5. The process according to claim 1, wherein the dope is spun sequentially into a dry air gap and then into a coagulation medium.

6. The process according to claim 1, wherein the dope is spun as a wet process directly into the coagulation medium.

7. The process according to claim 1, wherein the coagulation fluid injected into the tube of the spinnerette and the coagulation medium into which the dope is spun is comprised of water.

8. The process according to claim 1, wherein the spinning dope is degassed and filtered before spinning.

9. The process according to claim 1, wherein the spinning dope has a viscosity of greater than about 5 × 10$^4$ cps at a spinning temperature.

10. The process according to claim 1, wherein the desolvating and washing and drying of the formed membrane results in a membrane having less than about 0.5 percent by weight residual solvent.

11. The process according to claim 1, wherein the Lewis base solvent is comprised of an amide solvent having DN numbers of 26 to 30 and the weak non-solvent Lewis acid has an AN number of from 47 to 63.

* * * * *